(12) United States Patent
Searles et al.

(10) Patent No.: US 9,306,457 B2
(45) Date of Patent: Apr. 5, 2016

(54) INSTANTANEOUS LOAD CURRENT MONITORING

(71) Applicant: Apple Inc., Cupertino, CA (US)

(72) Inventors: Shawn Searles, Austin, TX (US); Jay B. Fletcher, Austin, TX (US)

(73) Assignee: Apple Inc., Cupertino, CA (US)

( * ) Notice: Subject to any disclaimer, the term of this patent is extended or adjusted under 35 U.S.C. 154(b) by 144 days.

(21) Appl. No.: 14/096,868

(22) Filed: Dec. 4, 2013

(65) Prior Publication Data

US 2015/0155780 A1    Jun. 4, 2015

(51) Int. Cl.
  *G05F 1/10* (2006.01)
  *H02M 3/158* (2006.01)
  *G05F 1/46* (2006.01)

(52) U.S. Cl.
  CPC *H02M 3/158* (2013.01); *G05F 1/46* (2013.01)

(58) Field of Classification Search
  None
  See application file for complete search history.

(56) References Cited

U.S. PATENT DOCUMENTS

| 4,623,871 | A  | * | 11/1986 | Akano | 340/12.36 |
|---|---|---|---|---|---|
| 6,812,674 | B2 | * | 11/2004 | Hoffman | 320/162 |
| 7,180,274 | B2 |   | 2/2007 | Chen et al. | |
| 7,443,178 | B2 | * | 10/2008 | Graefling | 324/721 |
| 7,449,942 | B2 | * | 11/2008 | Bonaccio et al. | 327/553 |
| 7,589,514 | B1 | * | 9/2009 | Fernald | 324/76.11 |
| 8,410,826 | B2 | * | 4/2013 | Koto et al. | 327/108 |
| 8,866,453 | B2 | * | 10/2014 | Lyle, Jr. | 323/266 |
| 9,024,678 | B2 | * | 5/2015 | Vacca Cavalotto et al. | 327/434 |
| 2004/0051582 | A1 | * | 3/2004 | Fan et al. | 327/540 |
| 2011/0050196 | A1 | * | 3/2011 | Fuse et al. | 323/312 |
| 2011/0109377 | A1 | * | 5/2011 | Fujibe et al. | 327/538 |
| 2012/0200277 | A1 |   | 8/2012 | Silva et al. | |
| 2012/0313571 | A1 |   | 12/2012 | Knowlton | |
| 2013/0207630 | A1 |   | 8/2013 | Rahardjo et al. | |
| 2015/0069990 | A1 | * | 3/2015 | Feldtkeller | 323/284 |
| 2015/0137774 | A1 | * | 5/2015 | Weis et al. | 323/234 |

FOREIGN PATENT DOCUMENTS

| JP | 2007097395 | 4/2007 |
|---|---|---|
| WO | 2008035033 | 3/2008 |
| WO | 2012164344 | 6/2012 |
| WO | 2013109889 | 7/2013 |

OTHER PUBLICATIONS

International Search Report and Written Opinion from PCT/US2014/060851, issued Jan. 19, 2015, Apple Inc., pp. 1-10.
Written Opinion in application No. PCT/US2014/060851, issued Nov. 2, 2015.

* cited by examiner

*Primary Examiner* — Thomas J Hiltunen
(74) *Attorney, Agent, or Firm* — Meyertons, Hood, Kivlin, Kowert & Goetzel, P.C.; Erik A. Heter

(57) ABSTRACT

A method and apparatus for monitoring instantaneous load current is disclosed. In one embodiment, an integrated circuit includes a voltage regulator and at least one functional unit implemented thereon. The voltage regulator includes a supply circuit configured to provide a voltage to the functional unit, and a sense circuit configured to determine an amount of current provided to the functional unit by the supply circuit. The sense circuit may determine the instantaneous load current being provided to the functional unit. An indication circuit is configured to provide, to the functional unit, an indication of the amount of current supplied thereto by the supply circuit.

17 Claims, 5 Drawing Sheets

INSTANTANEOUS LOAD CURRENT MONITORING

BACKGROUND

1. Technical Field

This disclosure is directed to integrated circuits, and more particularly, to voltage regulators having circuits for sensing instantaneous load current.

2. Description of the Related Art

As the integrated circuit (IC) features sizes have decreased, the number of functions integrated on new ICs has increased. For example, a system-on-a-chip (SoC) may include multiple processor cores, a graphic processing unit, various interface circuits, and so forth. Some SoCs (as well as other types of ICs) may also implement a voltage regulator on the same die as the other functional units. The voltage regulator may provide power to various ones of the functional units. In some cases, the voltage regulator may provide multiple voltages to different functional units via different power nodes.

Each of the different functional units of an IC may place various current demands on the voltage regulator in accordance with their respective workloads. In some cases, if the voltage regulator is unable to fully meet the current demanded by a particular functional block, a voltage droop may occur on the power node supplying power to that particular functional block. Bulk capacitance between the power node and a reference (e.g., ground) node may supply some of the current, and eventually, may cause the voltage to return to a value within its specified range.

SUMMARY

A method and apparatus for monitoring instantaneous load current is disclosed. In one embodiment, an integrated circuit includes a voltage regulator and at least one functional unit implemented thereon. The voltage regulator includes a supply circuit configured to provide a voltage to the functional unit, and a sense circuit configured to determine an amount of current provided to the functional unit by the supply circuit. The sense circuit may determine the instantaneous load current being provided to the functional unit. An indication circuit is configured to provide, to the functional unit, an indication of the amount of current supplied thereto by the supply circuit.

In one embodiment, a method includes a voltage regulator providing a supply voltage to a functional unit, and a sense circuit within the voltage regulator determining the amount of current provided to the functional unit. The voltage regulator and the sense circuit are implemented on a common integrated circuit die. An indication circuit is coupled to the sense circuit, and is configured to provide an indication (e.g., in the form a of a digital code) to the functional unit such that the latter is informed of the amount of current it is consuming.

Generally speaking, the disclosure is directed to determining an instantaneous current drawn from a voltage regulator by a load circuit, and providing an indication of the instantaneous current to the load circuit.

BRIEF DESCRIPTION OF THE DRAWINGS

The following detailed description makes reference to the accompanying drawings, which are now briefly described.

Figure 1:
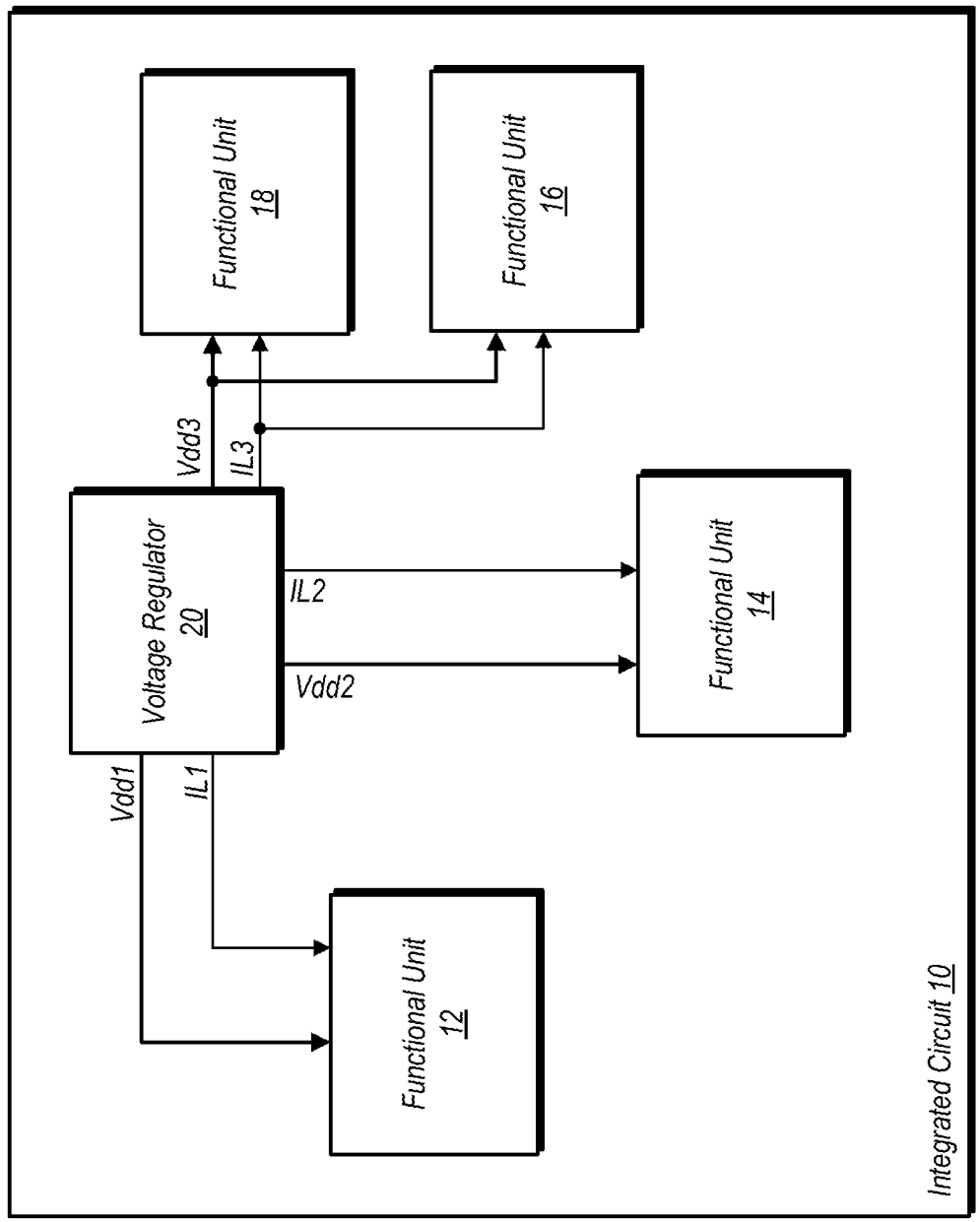
FIG. 1 is a block diagram of one embodiment of an IC.

While the disclosed subject matter is susceptible to various modifications and alternative forms, specific embodiments thereof are shown by way of example in the drawings and will herein be described in detail. It should be understood, however, that the drawings and detailed description thereto are not intended to limit the subject matter to the particular form disclosed, but on the contrary, the intention is to cover all modifications, equivalents and alternatives falling within the spirit and scope of the disclosed subject matter as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of an IC is shown. In the exemplary embodiment, IC 10 includes functional units 12, 14, 16, and 18, and a voltage regulator 20. Each of the functional units is configured to perform one of the functions of IC 10. Various types of functional units may be implemented on IC 10, which in one embodiment, may be a system-on-a-chip (SoC). Such functional unit types may include processor cores, graphics processing units, interface units, and so on. In general, the functional units may be any type of circuitry, and may be digital, analog, and/or mixed signal.

Voltage regulator 20 in the embodiment shown may comprise a number of voltage regulation circuits therein, each of which is configured to regulate and provide a supply voltage to a corresponding load circuit. In this example, voltage regulator 20 provides voltage Vdd1 to a first load circuit, functional unit 12, Vdd2 to a second load circuit, functional unit 14, and Vdd3 to a third load circuit that includes functional units 16 and 18. In addition to providing a supply voltage to each of these load circuits, voltage regulator 20 in the embodiment shown is configured to provide indications of current consumption to each functional unit that makes up one of the load circuits. Functional unit 12 in the embodiment shown is configured to receive indication IL1 while functional unit 14 is configured to receive indication IL2. Functional units 16 and 18, which together provide a single load (since they are both connected to Vdd3) are configured to receive indication IL3.

In one embodiment, the indications may provide information regarding the instantaneous current consumption. Since voltage regulator 20 is implemented on the same IC die in this embodiment, the instantaneous current may be converted into an indication and provided to a respective load with very little latency. In some embodiments, the indications may be provided as a digital value or code, although this is not a requirement for all embodiments.

While it is noted that voltage regulator 20 in the embodiment shown is configured to provide multiple supply voltages, embodiments wherein a voltage regulator provide only a single supply voltage are possible and contemplated. Generally speaking, a voltage regulator in accordance with this disclosure may provide as many or as few supply voltages as desired, and may as such be configured accordingly. Furthermore, a voltage regulator in accordance with this disclosure may be able to provide indications of current consumption (e.g., instantaneous current) to each load circuit that is coupled to a corresponding one of the supply voltage nodes. Furthermore, while various embodiments of a voltage regulator discussed herein are implemented as buck regulators, it is noted that the disclosure is not intended to be limiting in this regard.

Figure 2:
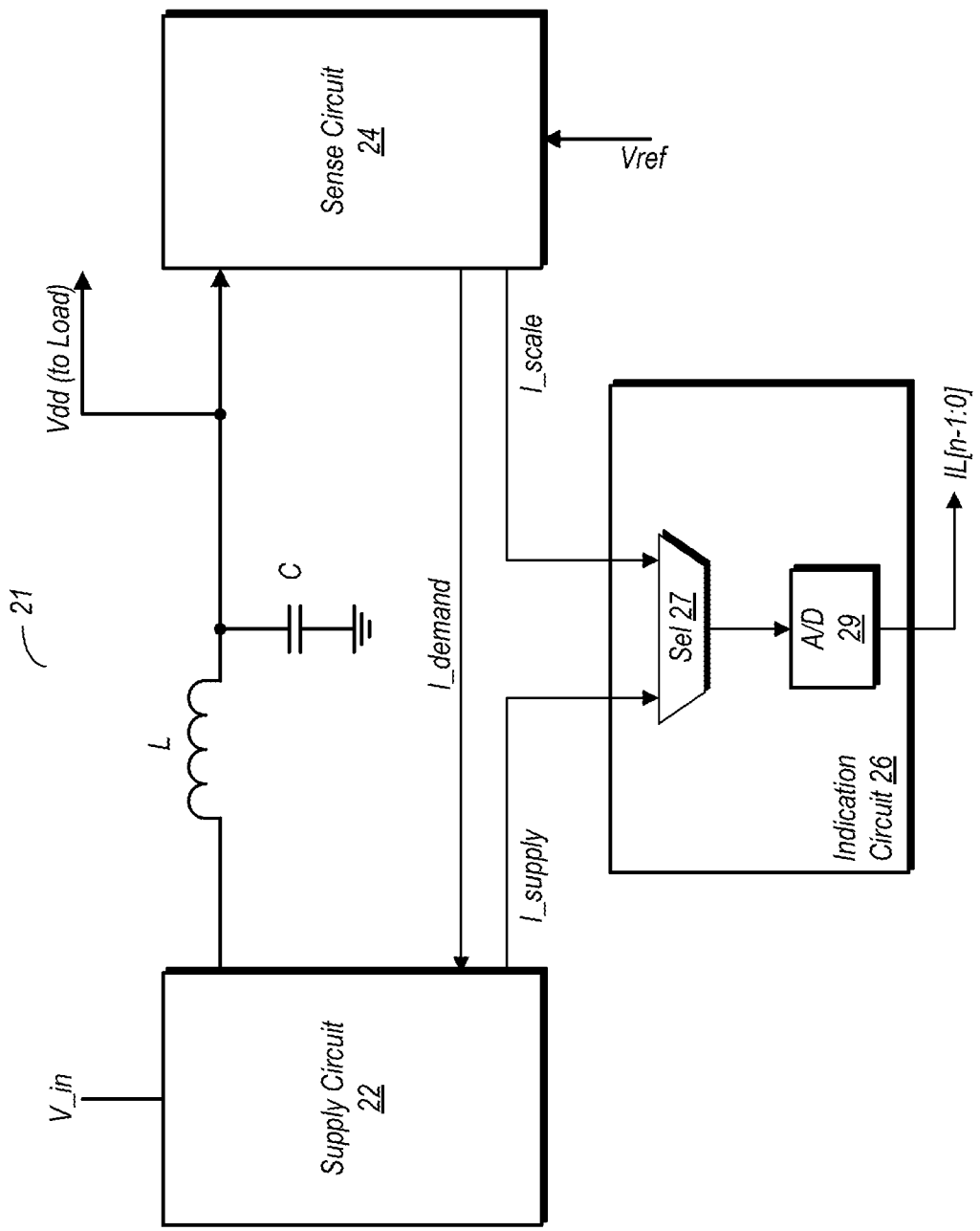
FIG. 2 is a block diagram of one embodiment of a voltage regulator circuit.

Moving on to FIG. 2, a block diagram of one embodiment of a voltage regulator in accordance with the disclosure. In the embodiment shown, voltage regulator 21 includes a supply circuit 22, a sense circuit 24, and an indication circuit 26. Supply circuit 22 in the embodiment shown is a regulation circuit configured to regulate the output voltage Vdd. As shown here, supply circuit 22 is configured to receive power through input V_in from another source (e.g., a power source external to the IC). Supply circuit 22 is further configured to generate an output voltage, Vdd, at a specified level. The specified level of the output voltage Vdd may in some cases be variable, while in other cases, may be static. The supply voltage is provided through inductor L to a load circuit, such as one or more of the exemplary functional units discussed above. Capacitor C in the illustrated embodiment may be representative of the bulk capacitance between Vdd and ground.

Sense circuit 24 in the embodiment shown is coupled to receive Vdd from supply circuit 22, and is further coupled to receive a reference voltage, Vref. The reference voltage may be the desired voltage for Vdd. In some embodiments, Vref (and thus, Vdd) may be variable. In other embodiments, Vref and Vdd may both be static voltages.

As will be discussed in further detail below, one embodiment of sense circuit 24 may include a voltage to current conversion circuit. In this particular embodiment, such a circuit may produce two output currents, I_scale and I_demand. I_scale may be a scaled version of the instantaneous current consumed by the load circuit coupled to receive Vdd. I_demand may be the current instantaneously demanded by the load circuit coupled to receive Vdd, and this current may be different from the actual instantaneous current. However, the demand current may nevertheless be a reflection of the current consumed by the load circuit, and may thus be indicative of the same.

As used herein, the term "instantaneous current" may be defined as the current consumed (or demanded) at a given point in time. The value of this current (or the related demand current) may be captured and provided as an indication minimal latency.

Voltage regulator 21 in the embodiment shown also includes an indication circuit 26. In this particular embodiment, indication circuit 26 includes a selection circuit 27 coupled to receive I_scale from sense circuit 24. Additionally, selection circuit 27 in the illustrated embodiment is also coupled to receive I_supply, which is the un-scaled instantaneous current provided to the load circuit by supply circuit 22. It is noted that embodiments are possible and contemplated in which only two or one of these currents is received by indication circuit 26. In embodiments where only one of these current values is received by indication circuit, selection circuit 27 can be omitted.

The output of selection circuit 27 in the embodiment shown is coupled to analog-to-digital converter (A/D) 29, which is configured to convert the received current into an indication of instantaneous current a digital value, IL[n−1:0] having n bits. A/D 29 may be any suitable type of analog-to-digital converter. However, it is also noted that A/D 29 may be optional if it is desired to provide the indication as an analog value. In such cases, other circuitry may be provided if desired (e.g., to scale the analog signal to a specific range, etc.). The indication generated by indication circuit 26 may then be distributed to the load circuit (e.g., a functional unit) for further use/processing.

Figure 3:
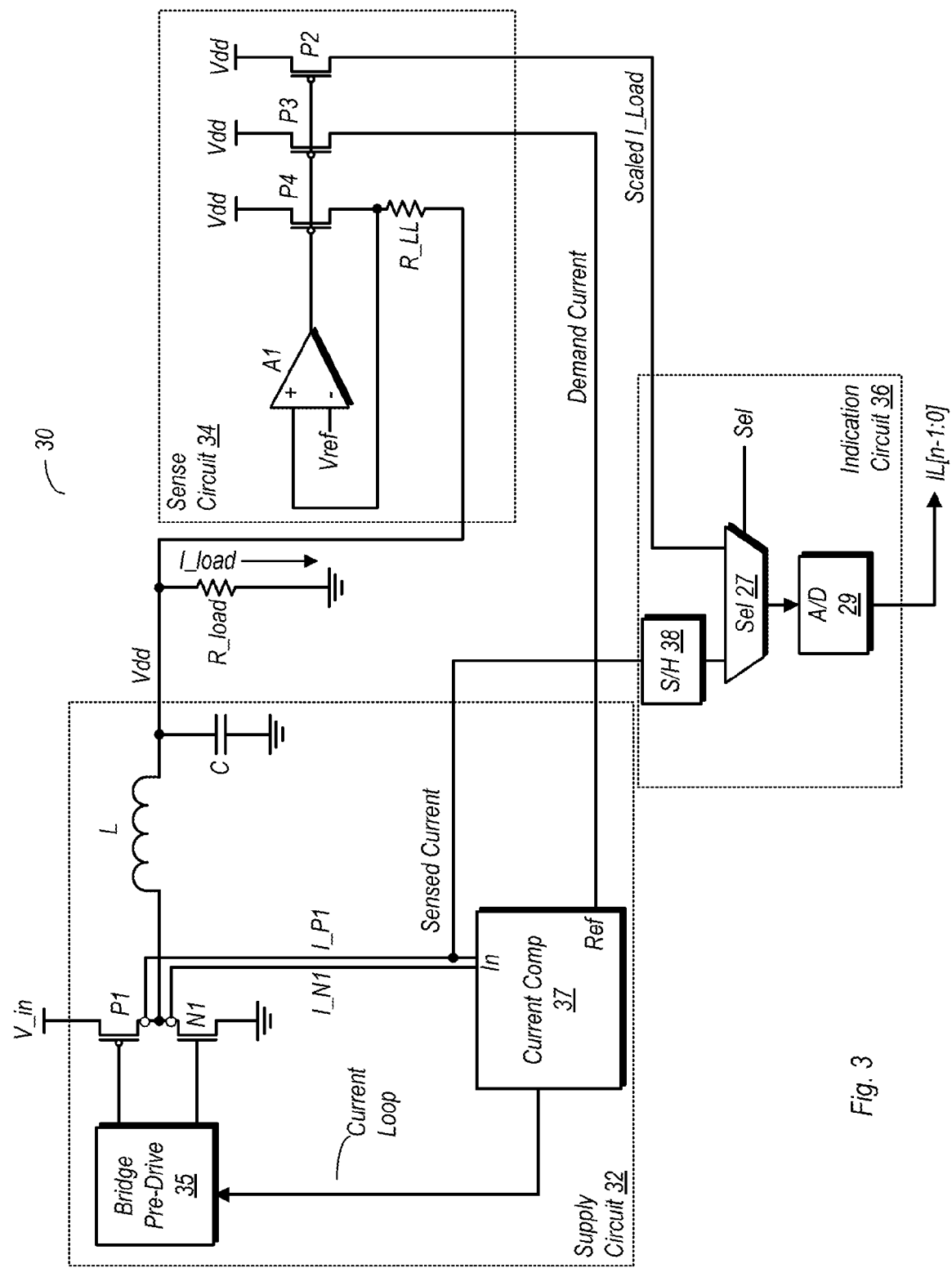
FIG. 3 is a schematic diagram of one embodiment of a voltage regulator circuit.

FIG. 3 is a schematic diagram of one embodiment of a voltage regulator circuit. In the embodiment shown, voltage regulator 30 includes a supply circuit 32, a sense circuit 34, and an indication circuit 36. Supply circuit 32 is configured to provide voltage Vdd to a load circuit, represented here by resistor R_load.

Supply circuit 32 in the embodiment shown functions as a buck converter, and includes bridge pre-drive circuit 35 which is configured to activate one of transistors P1 and N1. Supply circuit 32 also includes current comparator 37, which is coupled to receive the current outputs from the junction of P1 and N1, along with the demand current, and is configured to drive a corresponding signal to bridge pre-drive circuit 35. Inductor L and capacitor C in the embodiment shown serve the same functions as in the example shown in FIG. 2. The current output from N1, I_N1, is a valley current, while the current output from P1, I_P1, is a peak current. These currents are provided to the input 'In', which may be a dual input as shown in the drawing or alternatively, may be a single input.

Sense circuit 34 in the embodiment shown includes amplifier A1, which is coupled to receive the reference voltage, Vref, on one of its input. In this example, Vref is received on the inverting input of A1, although in some embodiments the polarity may be reversed if the polarity of transistors P2, P3, and P4 is also reversed. The other input of A1 in this embodiment is coupled to the drain terminal of transistor P4, which is also coupled to resistor R_LL. As a result, the signal input to the non-inverting input of A1 in this embodiment is a voltage indicative of the actual voltage Vdd. The output signal generated by amplifier A1 is thus an indication of the difference between the desired value of Vdd (Vref), and the actual value of Vdd.

Amplifier A1 along with transistors P2 and P3 combine to form a circuit that converts an output voltage into two different currents. Both of transistors P2 and P3 have gate terminals coupled to the output of amplifier A1, and are thus responsive to the voltage thereon. The current from the drain of transistor P2 in the embodiment shown is a scaled version of the load current, i.e. the current consumed by the load circuit (represented by I_load, the current through R_load in this drawing). The current from the drain of transistor P3 is the demand current, i.e. the current that is being demanded by the load circuit, which may be different from the actual load current.

The difference between these two currents may be achieved by sizing transistors P2 and P3 differently from one another. Both the Scaled I_Load and Demand Current values may be indicative of instantaneous current consumption by the load circuit.

It is noted that sense circuit 34 may be configured differently. For example, embodiments are possible and contemplated wherein only the scaled load current is produced, while in other embodiments, only the demand current is produced.

Voltage regulator 30 in this embodiment also includes a sense circuit 36, which is similar to that shown in FIG. 2. The primary difference is the presence of sample/hold circuit 38. Supply circuit 32 in the embodiment shown is coupled to provide the sensed load current ('Sensed Current') to sample/hold circuit 38. The sensed current has a value that is effectively the same as the actual load current, with any difference therebetween being negligible. Since supply circuit 32 operates as a buck converter in this embodiment, the sensed current may rise and fall (in some cases, periodically) in accordance with the operation of transistors P1 and N1. Sample/hold circuit 38 may thus be timed to sample the sensed load current at a certain part of its cycle, e.g., at its peak. The sample may then be provided through selection circuit 27, if selected, to A/D 29 and converted to a digital value. It is noted however that sample/hold circuit 38 is optional, and may be omitted in other embodiments, such as one that uses a linear voltage regulator instead of a buck converter.

Selection circuit 27 may alternatively select either the demand current or the scaled load current to be converted into the indication of instantaneous load current IL[n−1:0]. The selection may be made in accordance with selection signal(s) ('SEL'), which may be generated by a source external to indication circuit 36. In various embodiments, a control circuit, the load, circuit, software, or other source may cause generation of the selection signals.

Figure 4:
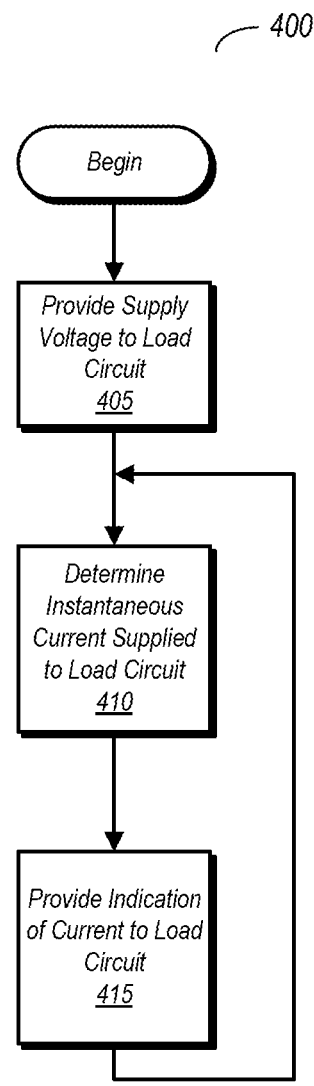
FIG. 4 is a flow diagram illustrating one embodiment of a method for determining and providing information regarding an instantaneous load current.

FIG. 4 is a flow diagram of one embodiment of a method for determining and providing information regarding an instantaneous load current. Method 400 as shown herein may be performed using the circuit/hardware embodiments discussed above in reference to FIGS. 1-3. Furthermore, method 400 may also be performed by circuit/hardware embodiments not discussed here but are otherwise configured to perform the functions called for by the various method steps.

Method 400 begins with the providing of a supply voltage, by a voltage regulator, to a load circuit (block 405). The voltage regulator may be specified to provide the supply voltage within a specified range of a desired value (e.g., 0.8 volts, ±5%). The load circuit may be a functional unit of the IC in which it is implemented, and may include analog, digital, or mixed signal circuitry.

Method 400 further includes determining the instantaneous current supplied to the load circuit by the voltage regulator (block 410). The instantaneous current may be directly tapped from a node in the voltage regulator (e.g., 'Sense Current' as shown in FIG. 3), or may be replicated (and possibly scaled) by other circuitry (e.g., the circuitry that generates 'Scaled I_Load' in FIG. 3). An indication of the instantaneous current provided to the load circuit may then be generated, with the indication also being provided to the load circuit (block 415). The indication may be a digital value in one embodiment, although embodiments in which the indication is provided in analog form are also possible and contemplated. The indication may be that of a scaled load current, the actual load current, or a current demanded by the load circuit, each of which may be reflective of the instantaneous current consumed.

Figure 5:
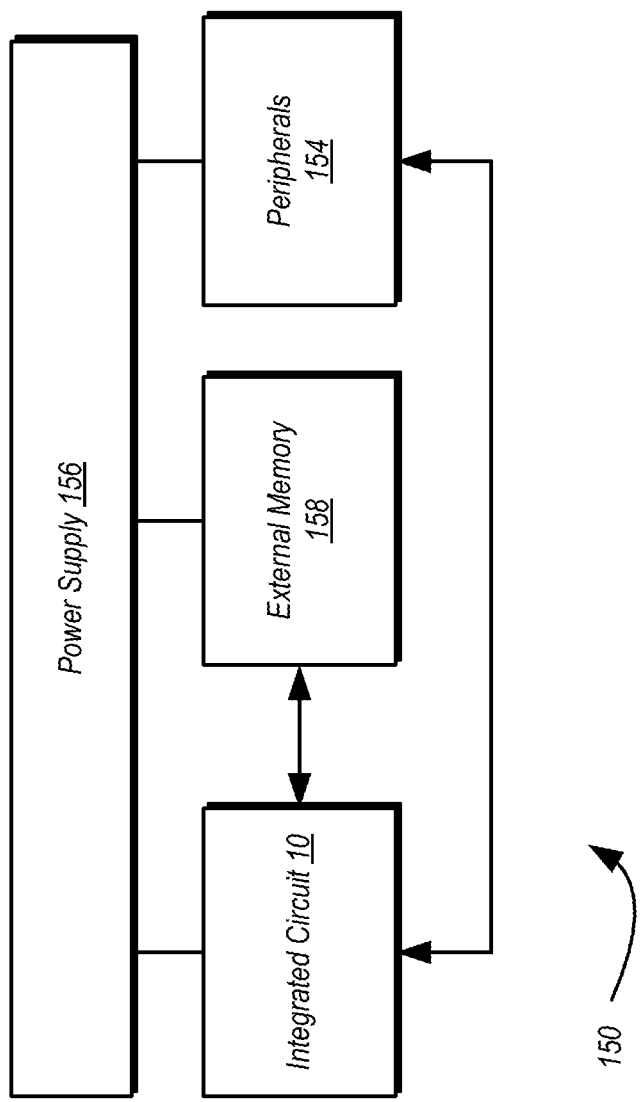
FIG. 5 is a block diagram of one embodiment of an exemplary system.

Turning next to FIG. 5, a block diagram of one embodiment of a system 150 is shown. In the illustrated embodiment, the system 150 includes at least one instance of the integrated circuit 10 coupled to external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
a load circuit; and
a voltage regulator, wherein the voltage regulator and the load circuit are integrated on a common integrated circuit die, wherein the voltage regulator includes:
a regulation circuit configured to provide a supply voltage to the load circuit;
a sensing circuit configured to sense an amount of current supplied to the load circuit by the regulation circuit, wherein the sensing circuit includes a voltage-to-current conversion circuit configured to generate a first current that is a scaled version of the amount of current supplied to the load circuit; and
an indication circuit configured to provide, to the load circuit, an indication of the amount of current supplied thereto by the regulation circuit.

2. The integrated circuit as recited in claim 1, wherein the voltage-to-current conversion circuit is further configured to generate a second current indicative of an amount of current demanded by the load circuit.

3. The integrated circuit as recited in claim 1, wherein the voltage-to-current conversion circuit includes:
an amplifier configured to generate an output voltage based on a difference between a reference voltage and a present value of the supply voltage;

a first transistor having a gate terminal coupled to receive the output voltage, the first transistor being configured to generate the first current;

a second transistor configured to generate a second current indicative of an amount of current demanded by the load circuit; and a third transistor configured to generate a voltage indicative of the present value of the supply voltage.

4. The integrated circuit as recited in claim 1, wherein the indication circuit is configured to provide a digital code to the load circuit, the digital code indicating the amount of current supplied by the regulation circuit.

5. The integrated circuit as recited in claim 4, wherein the indication circuit includes a selection circuit having a first input coupled to receive, from the sensing circuit, a first current indicative of an amount of current supplied to the load circuit by the regulation circuit, a second current, from the sensing circuit, indicative of an amount of current being demanded by the load circuit, and a third current from the regulation circuit, the third current being the current supplied to the load circuit by the regulation circuit.

6. The integrated circuit as recited in claim 5, wherein an output of the selection circuit is coupled to an analog-to-digital (A/D) converter, the A/D converter configured to provide a digital code having a plurality of bits to the load circuit, the digital code indicative of a value of a current on a selected one of the first, second, and third inputs of the selection circuit.

7. The integrated circuit as recited in claim 5, further comprising a sample and hold circuit coupled between the selection circuit and a current node in the regulation circuit, wherein the sample and hold circuit is configured to sample a value of the third current and to provide the sampled value to the selection circuit.

8. A method comprising:

providing a supply voltage from a voltage regulator to a load circuit, wherein the voltage regulator and the load circuit are implemented on a common integrated circuit die;

determining, using a sensing circuit implemented in the voltage regulator, an amount of current provided from the voltage regulator to the load circuit;

generating, using a voltage-to-current conversion circuit, a first current that is a scaled version of the amount of current provided to the load circuit; and providing, from the sensing circuit to the load circuit, an indication of the amount of current provided to the load circuit.

9. The method as recited in claim 8, wherein providing the indication comprises providing a digital code to the load circuit, the digital code being indicative of the amount of current provided to the load circuit.

10. The method as recited in claim 9, wherein the digital code is generated by an analog-to-digital converter (ADC), and wherein the method further comprises a selection circuit providing one of the following to the ADC:

a first current indicative of an amount of current supplied to the load circuit by the voltage regulator;

a second current indicative of an amount of current being demanded by the load circuit; and a third current equivalent to the current supplied to the load circuit.

11. The method as recited in claim 10, further comprising: a sample and hold circuit coupled sampling a value of the third current and providing the sampled value to the selection circuit.

12. The method as recited in claim 8, further comprising the voltage-to-current conversion circuit generating a second current indicative of an amount of current demanded by the load circuit.

13. The method as recited in claim 8 further comprising:

an amplifier of the voltage-to-current conversion circuit generating an output voltage based on a difference between a reference voltage and a present value of the supply voltage;

a first transistor of the voltage-to-current conversion circuit generating the first current based on the output voltage;

a second transistor of the voltage-to-current conversion circuit generating a second current indicative of an amount of current demanded by the load circuit; and a third transistor of the voltage-to-current conversion circuit generating a voltage indicative of the present value of the supply voltage.

14. A system comprising:

a functional unit;

a voltage regulator having a supply circuit and a sense circuit, wherein the supply circuit is configured to provide a supply voltage to the functional unit, and wherein the sense circuit is configured to determine an instantaneous current provided by the voltage regulator to the functional unit, wherein the sense circuit includes a first transistor configured to generate a first current proportional to the instantaneous current based on the difference between the supply voltage and the requested voltage; and an indication circuit configured to provide an indication of the instantaneous current to the functional unit.

15. The system as recited in claim 14, wherein the indication circuit is configured to provide the indication of the instantaneous current as a digital code.

16. The system as recited in claim 14, wherein the sense circuit includes an amplifier configured to generate a discrepancy signal indicative of a difference between the supply voltage and a requested voltage.

17. The system as recited in claim 14, wherein the sense circuit includes a second transistor configured to generate a second current indicative of the amount of current requested by the functional unit.

* * * * *